(No Model.)
W. A. STICKNEY.
CIGAR BOX.
No. 577,794. Patented Feb. 23, 1897.
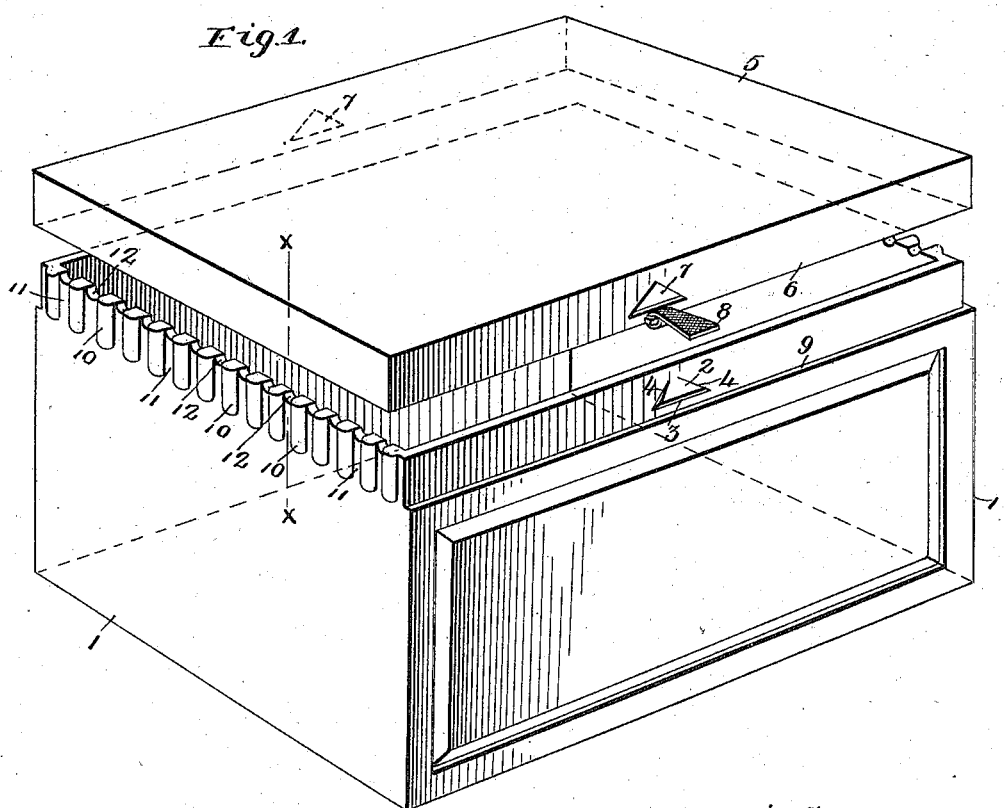
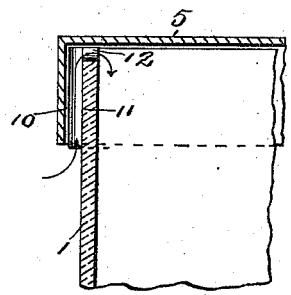
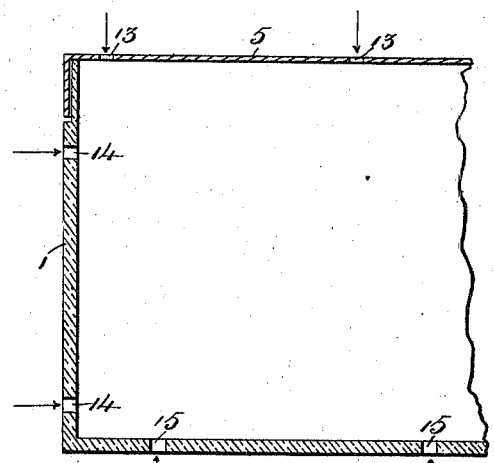
Witnesses
Alfred A. Mathey
H. B. Wells
Inventor
William A. Stickney.
By his Attorneys
Kellert Stower
THE NORRIS PETERS CO., PHOTO-LITHO., WASHINGTON, D. C.

UNITED STATES PATENT OFFICE.

WILLIAM A. STICKNEY, OF ST. LOUIS, MISSOURI.

CIGAR-BOX.

SPECIFICATION forming part of Letters Patent No. 577,794, dated February 23, 1897.

Application filed November 23, 1896. Serial No. 613,125. (No model.)

*To all whom it may concern:*

Be it known that I, WILLIAM A. STICKNEY, a citizen of the United States, residing at St. Louis, State of Missouri, have invented certain new and useful Improvements in Cigar-Boxes, of which the following is a full, clear, and exact description, reference being had to the accompanying drawings, forming a part hereof.

My invention has relation to improvements in display cigar-boxes; and it consists in the novel arrangement and combination of parts more fully set forth in the specification and pointed out in the claims.

In the drawings, Figure 1 is a perspective view of my improved box with the cover detached therefrom. Fig. 2 is a section on the line *x x* of Fig. 1, and Fig. 3 is a similar section of a modified form of box.

The present invention is an improvement on the cigar-box described in United States Letters Patent numbered 570,534, under date of November 3, 1896, and has for its object to introduce certain changes in the construction of said box whereby the latter may be better adapted to preserve for a maximum length of time cigars that are packed therein. It is well known that glass, of which the present box is preferably constructed, is practically impervious to moisture, and as the cover of the box makes the same practically air-tight it happens that fresh cigars packed therein (which as a rule are moist) have no communication with the outer air, and when the box is opened after a certain length of time the contents appear to be damp and moldy. On the other hand, if the cigars are dry in the first place, no provision is made for the free access to the same of air laden with moisture by which the necessary humidity can be imparted to the weed. By my present improvement, therefore, although the box possesses all the advantages of the construction set forth in the Letters Patent above referred to, further advantages will result, providing, as I do, suitable means whereby a free circulation of air is possible through the box without destroying the efficacy of the devices by which the cover is fastened to the box. In detail the box may be described as follows:

Referring to the drawings, 1 represents a rectangular glass box, either square or oblong in shape, designed to receive the cigars. Along two opposite (imperforate and rigid) walls of the box, and at a suitable distance from the upper edge thereof, are formed integrally with the walls suitable wedge-shaped rigid lugs having faces 2 inclined downwardly from the upper edges of the walls. The base 3 of each lug inclines upwardly toward the face 2, and the sides 4 of each lug also incline from the side walls of the box toward the face 2 of the lug. Adapted to be passed over the open end of the box is a (preferably) metallic cover 5, two of the opposite sides 6 of which have formed therein suitable triangular openings 7, conforming approximately in shape to the wedge-shaped lugs carried by the walls of the box, the sides 6 of the cover being sufficiently yielding to cause the bases of the openings to ride freely over the inclined faces of the lugs, after which said bases, by virtue of the resiliency of said sides 6, ride freely along the inclined bases 3 of the lugs and the sides of the opening slip freely along the inclined sides 4 of the lugs, and after the several inclined surfaces have been passed the resilient sides of the cover fit snugly against the walls of the box. In this manner the cover fits snugly and close to the walls of the box. To remove the cover, the sides thereof are distended beyond the projecting lugs by seizing the straps 8, carried by the sides of the cover in proximity to the openings formed therein. The yielding sides of the cover rest on the lateral ledges 9, formed on the corresponding walls of the box. It is of course obvious that any equivalents of the construction here set forth come within the spirit of my invention.

Disposed along the upper portion of the walls located adjacent to the two opposite walls carrying the lugs, and extending from the upper edges of said walls approximately to the plane of the ledges 9, but which may be extended, if desirable, to the lower edge of the box, are a series of preferably vertically-disposed corrugations or ridges 10, between which are formed a corresponding series of air-spaces 11, the edge of the wall at the upper end of each air-space being surmounted by a concave or dish-shaped depression 12, the peripheral walls of the ridges themselves being disposed in a plane exterior to the general plane of the outer surface of the wall on which said ridges are disposed. By this arrangement the outside air has free access to the interior of the box, thereby eliminating from the cigars any undue dampness, or, in case the cigars are too dry to begin with, imparting the necessary humidity to the same, the boxes being placed, of course, in the latter case in a moist atmosphere.

It is of course within the spirit of my invention to provide other equivalent means for allowing access of air into the box and permitting the free circulation of said air through the contents thereof, and in Fig. 3 I have shown openings 13, 14, and 15, respectively, in the top, sides, and bottom of the box. This arrangement, however, is inferior, as it destroys the box for any other purpose except perhaps that of a cigar-box.

Having described my invention, what I claim is—

1. A cigar-box comprising a box having rigid walls, suitable lugs formed integrally with the walls and disposed along the outer surfaces of two opposite walls at a suitable distance below the upper edges of the walls, a cover for the box having yielding sides and adapted to be passed over the walls of the box, suitable openings formed in the said sides of the cover through which the lugs carried by the walls are adapted to be passed and retain the cover in place, and suitable corrugations forming corresponding air-spaces, carried by the outer surfaces of the two remaining walls, said air-spaces communicating with the interior of the box for permitting free access of air into the box, the corrugations extending approximately from the upper edges of the walls along which they are disposed to a suitable distance downward along said walls, substantially as set forth.

2. A cigar-box comprising a box having rigid walls, a ledge disposed along each of two opposite walls thereof at a suitable distance below the upper edges of said walls, suitable lugs formed with or carried by the said walls and disposed along the outer surfaces of said walls adjacent to said ledge and between the ledges and the upper edge of the box, a cover for the box having yielding sides adapted to be passed over the walls of the box, suitable openings formed in said yielding sides of the cover through which the lugs carried by the walls are adapted to pass and retain the cover in place, the lower corresponding edges of the sides of the cover adapted to rest on said ledges, suitable corrugations forming corresponding air-spaces disposed along the upper portions of the two remaining opposite walls of the box, the outer peripheral surfaces of the corrugations or ridges being disposed in a plane exterior to the general plane of the surface of the wall carrying the same, the edge of the wall at the upper ends of the several air-spaces being bounded by dish-shaped or concave depressions whereby the air-spaces formed between the series of corrugations are free to communicate with the interior of the box and permit the free circulation of air through the box, substantially as set forth.

In testimony whereof I affix my signature in presence of two witnesses.

WM. A. STICKNEY.

Witnesses:
ALFRED A. MATHEY,
EMIL STAREK.